United States Patent
Ding et al.

(10) Patent No.: US 12,347,149 B2
(45) Date of Patent: Jul. 1, 2025

(54) SYSTEM, METHOD, AND COMPUTER PROGRAM FOR CONTENT ADAPTIVE ONLINE TRAINING FOR MULTIPLE BLOCKS IN NEURAL IMAGE COMPRESSION

(71) Applicant: TENCENT AMERICA LLC, Palo Alto, CA (US)

(72) Inventors: Ding Ding, Palo Alto, CA (US); Wei Wang, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 406 days.

(21) Appl. No.: 17/950,569

(22) Filed: Sep. 22, 2022

(65) Prior Publication Data

US 2023/0186525 A1     Jun. 15, 2023

Related U.S. Application Data (60) Provisional application No. 63/289,033, filed on Dec. 13, 2021.

(51) Int. Cl.
*G06T 9/00* (2006.01)
*G06N 3/045* (2023.01)
*G06T 3/4046* (2024.01)

(52) U.S. Cl.
CPC ............ *G06T 9/002* (2013.01); *G06N 3/045* (2023.01); *G06T 3/4046* (2013.01)

(58) Field of Classification Search
CPC ........ G06T 9/002; G06T 3/4046; G06N 3/045

USPC .......................................................... 382/232
See application file for complete search history.

(56) References Cited

U.S. PATENT DOCUMENTS

| | | |
|---|---|---|
| 5,729,661 A | 3/1998 | Keeler et al. |
| 2017/0148431 A1 | 5/2017 | Catanzaro et al. |
| 2020/0029084 A1 | 1/2020 | Wierstra et al. |
| 2020/0366914 A1 | 11/2020 | Schroers et al. |
| 2022/0021870 A1 | 1/2022 | Jiang et al. |
| 2022/0051367 A1 | 2/2022 | Jiang et al. |

OTHER PUBLICATIONS

Pytorch, Github, 2018 (Year: 2018).*
Toderici, Full Resolution Image Compression with Recurrent Neural Networks, CVPR (Year: 2017).*
Kingma, "Adam: a Method for Stochastic Optimization", ICLR (Year: 2015).*

(Continued)

*Primary Examiner* — Mark Roz
(74) *Attorney, Agent, or Firm* — Sughrue Mion, PLLC (57) ABSTRACT

Content-adaptive online training for end-to-end (E2E) neural image compression (NIC) using a neural network performed by at least one processor, is provided, including receiving an input image, to an E2E NIC framework, including one or more blocks, preprocessing a first neural network of the E2E NIC framework, based on the one or more blocks, computing updated parameters using the preprocessed first neural network, encoding the one or more blocks and the updated parameters, updating the first neural network based on the encoded updated parameters, and generating a compressed representation of the encoded one or more blocks using the updated first neural network.

18 Claims, 9 Drawing Sheets

(56) References Cited

OTHER PUBLICATIONS

International Search Report dated Jan. 20, 2023 in International Application No. PCT/US2022/045007.
Written Opinion of the International Searching Authority dated Jan. 20, 2023 in International Application No. PCT/US2022/045007.
Wei Jiang et al., "Online Meta Adaptation for Variable-Rate Learned Image Compression", Proceedings of the IEEE/CVF Conference on Computer Vision and Pattern Recognition, 2021, pp. 1-9 (9 pages total).
Guanbo Pan et al., "Content Adaptive Latents and Decoder for Neural Image Compression", European Conference on Computer Vision, 2022, pp. 1-18 (34 pages total).
Hyunho Yeo et al., "Neural Adaptive Content-aware Internet Video Delivery", 13th USENIX Symposium on Operating Systems Design and Implementation (OSDI '18), 2018, pp. 645-661 (18 pages total).
Zhenghui Zhao, et al. "Learned Image Compression using Adaptive Block-wise Encoding and Reconstruction Network", International Symposium on Circuits and Systems(ISCAS), 2021, IEEE (5 Pages).
Japanese Office Action dated Oct. 15, 2024 in Application No. 2023-560171.
Nannan Zou, et al."$L^2C$— Learning to Learn to Compress", Cornell University Library, Jul. 31, 2020, XP081730216 (6 Pages).
Yat-Hong Lam, et al. "Efficient Adaptation of Neural Network Filter for Video Compression", CHI Conference On Human Factors in Computing Systems, Oct. 12-26, 2020, pp. 358-366 (9 pages).
Extended European Search Report dated Mar. 3, 2025 in Application No. 22908169.0.

\* cited by examiner

SYSTEM, METHOD, AND COMPUTER PROGRAM FOR CONTENT ADAPTIVE ONLINE TRAINING FOR MULTIPLE BLOCKS IN NEURAL IMAGE COMPRESSION

CROSS-REFERENCE TO RELATED APPLICATION

This application is based on and claims priority to U.S. Provisional Patent Application No. 63/289,033, filed on Dec. 13, 2021, the disclosure of which is incorporated by reference herein in its entirety.

BACKGROUND

A traditional hybrid video codec is difficult to be optimized as a whole. An improvement of a single module may not result in a coding gain in overall performance. Recently, Standard groups and companies have been actively searching for potential needs for standardization of future video coding technology. These standard groups and companies have established JPEG-AI group focusing on AI-based end-to-end neural image compression using Deep Neural Networks (DNN). The Chinese AVS standard has also formed AVS-AI special group to work on neural image and video compression technologies. The success of recent approaches has brought more and more industrial interests in advanced neural image and video compression methodologies.

However, in related art, neural network based video or image coding frameworks are limited to specific types of compression frameworks. In order to accommodate various types of frameworks, conventional systems may require increased computing memory/cost and increased rate-distortion loss, resulting in an overall lower performance of the image or video framework/process.

Therefore, methods of optimizing the coding framework and improving the overall performance are needed.

SUMMARY

According to embodiments, methods are provided for content adaptive online training for multiple blocks in neural image compression.

According to an aspect of the disclosure, a method of content-adaptive online training for end-to-end (E2E) neural image compression (NIC) using a neural network performed by at least one processor, is provided. The method includes receiving an input image, to an E2E NIC framework, including a one or more blocks; preprocessing a first neural network of the E2E NIC framework, based on the one or more blocks; computing updated parameters using the preprocessed first neural network; encoding the one or more blocks and the updated parameters; updating the first neural network based on the encoded updated parameters; and generating a compressed representation of the encoded one or more blocks using the updated first neural network.

The method may further include splitting the input image into the one or more blocks; and compressing the one or more blocks individually.

The method may further include decoding the compressed representation using arithmetic decoding; and generating a reconstructed image based on the decoded compressed representation using a second neural network.

The method may further include compressing the updated parameters.

In some embodiments, the updated parameters include a learning rate and a number of steps, and the learning rate and the number of steps are selected based on characteristics of the input image. Further, the characteristics of the input image are one of a RGB variance of the input image and an RD performance of the input image.

In some embodiments, when preprocessing the first neural network, the first neural network is fine-tuned using the one or more blocks.

According to another aspect of the disclosure, an apparatus for content E2E NIC using a neural network, including at least one memory configured to store computer program code and at least one processor configured to read the computer program code and operate as instructed by the computer program code, is provided. The computer program code including receiving code configured to cause at least one processor to receive an input image, to an E2E NIC framework, including a one or more blocks; preprocessing code configured to cause at least one processor to preprocess a first neural network of the E2E NIC framework, based on the one or more blocks; computing code configured to cause at least one processor to compute updated parameters using the preprocessed first neural network; encoding code configured to cause at least one processor to encode the one or more blocks and the updated parameters; updating code configured to cause at least one processor to update the first neural network based on the encoded updated parameters; and first generating code configured to cause at least one processor to generate a compressed representation of the encoded one or more blocks using the updated first neural network.

The apparatus may further include building code configured to cause the at least one processor to split the input image into the one or more blocks and compress the one or more blocks individually.

The apparatus may further include concatenating code configured to cause the at least one processor to decode the compressed representation using arithmetic decoding and generate a reconstructed image based on the decoded compressed representation using a second neural network.

The apparatus may further include concatenating code configured to cause the at least one processor to compress the updated parameters.

According to another aspect of the disclosure, a non-transitory computer-readable medium storing instructions that are executed by at least one processor, of an apparatus for content-adaptive online training for E2E NIC using a neural network, is provided. The instructions cause the at least one processor to receive an input image, to an E2E NIC framework, including a one or more blocks; preprocess a first neural network of the E2E NIC framework, based on the one or more blocks; compute updated parameters using the preprocessed first neural network; encode the one or more blocks and the updated parameters; update the first neural network based on the encoded updated parameters; and generate a compressed representation of the encoded one or more blocks using the updated first neural network.

The non-transitory computer-readable medium may further include instructions that further cause the at least one processor to split the input image into the one or more blocks, and compress the one or more blocks individually.

The non-transitory computer-readable medium may further include instructions that further cause the at least one processor to decode the compressed representation using arithmetic decoding; and generate a reconstructed image based on the decoded compressed representation using a second neural network.

The non-transitory computer-readable medium may further include instructions that further cause the at least one processor to compress the updated parameters.

Additional embodiments will be set forth in the description that follows and, in part, will be apparent from the description, and/or may be realized by practice of the presented embodiments of the disclosure.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

The proposed features discussed below may be used separately or combined in any order. Further, the embodiments may be implemented by processing circuitry (e.g., one or more processors or one or more integrated circuits). In one example, the one or more processors execute a program that is stored in a non-transitory computer-readable medium.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and an apparatus for content-adaptive online training for multiple blocks in end-to-end (E2E) neural image compression (NIC) optimized networks. The E2E optimized networks may be, e.g., an artificial neural network (ANN) based image coding framework. In ANN-based video coding frameworks, by performing a machine learning process, different modules may be jointly optimized from input to output to improve a final objective (e.g., rate-distortion performance), resulting in E2E optimized NIC.

Figure 1:
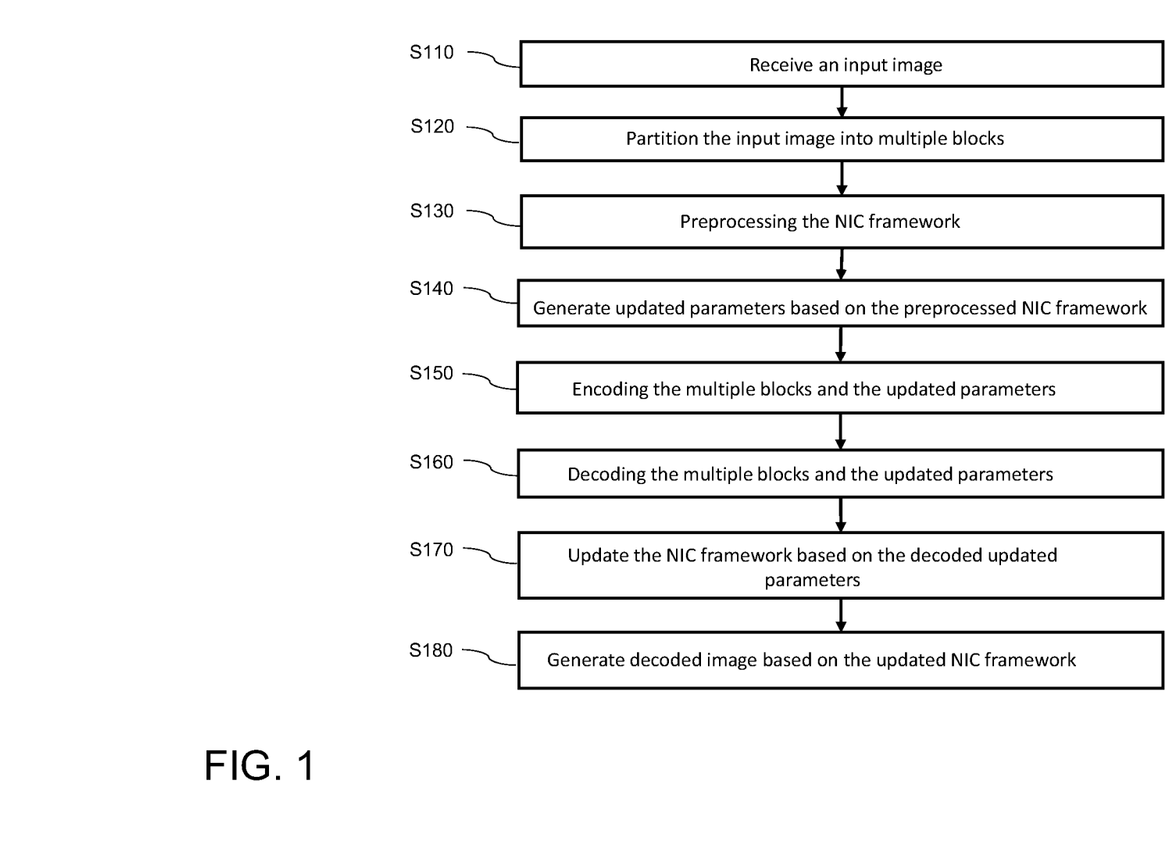
FIG. 1 is a flowchart of a general overview of a content-adaptive online training process for an end-to-end (E2E) neural image compression (NIC), according to embodiments.

FIG. 1 is a flowchart of a general overview of a content-adaptive online training process for E2E NIC performed by a content-adaptive online training NIC framework, a content-adaptive online training system, or the like, according to embodiments.

First, an input image (or video sequence) is received (S110). Then, at S120, the image is partitioned (or split) into multiple blocks. Block-wise image coding may be performed on the partition blocks to compress the blocks. At S130, preprocessing of the content-adaptive online training NIC framework is performed to fine-tune the network. At S140, updated parameters are generated based on the fine-tuned network. The updated parameters may include, but are not limited to, for example, a step size (i.e., learning rate) and a number of steps. The blocks and the generated updated parameters are then encoded by, e.g., a DNN encoder (S150) and then decoded by, e.g., a DNN decoder (S160). The decoded updated parameters are used to update the NIC framework (S170). Finally, a decoder of the updated NIC framework is used to decode and generate a final image. That is, at S180, a decoded image is generated based on the updated NIC framework.

Figure 2:
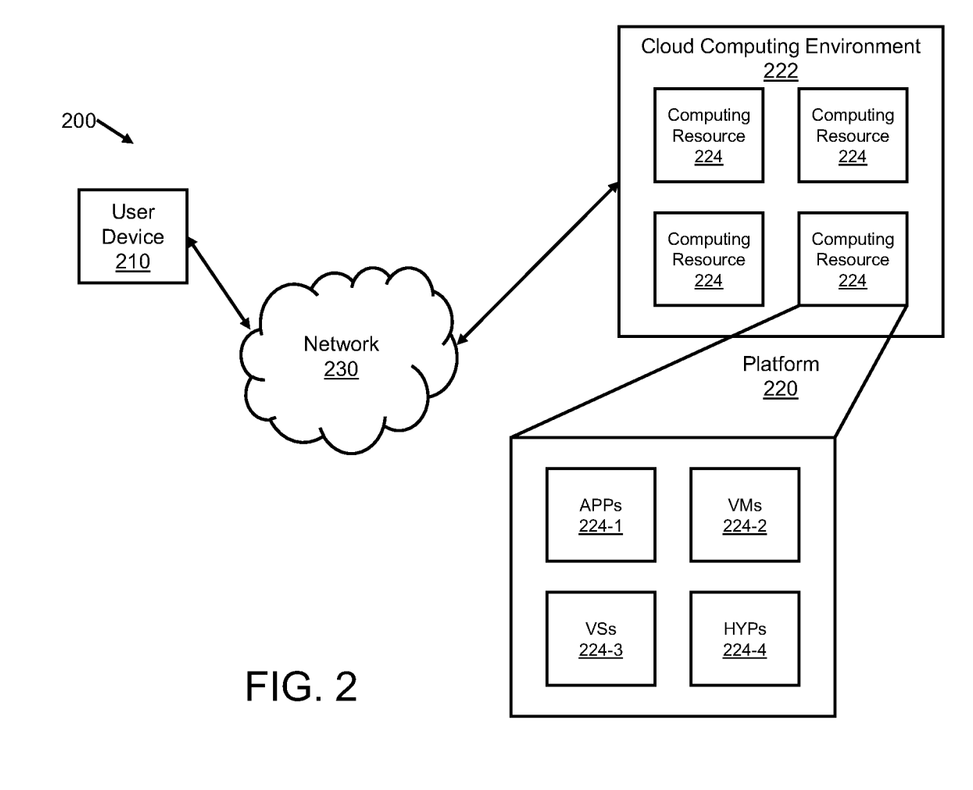
FIG. 2 is a diagram of an environment in which methods, apparatuses and systems described herein may be implemented, according to embodiments.

FIG. 2 is a diagram of an environment 200 in which methods, apparatuses and systems described herein may be implemented, according to embodiments.

As shown in FIG. 2, the environment 200 may include a user device 210, a platform 220, and a network 230. Devices of the environment 200 may interconnect via wired connections, wireless connections, or a combination of wired and wireless connections.

The user device 210 includes one or more devices capable of receiving, generating, storing, processing, and/or providing information associated with platform 220. For example, the user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 210 may receive information from and/or transmit information to the platform 220.

The platform 220 includes one or more devices as described elsewhere herein. In some implementations, the platform 220 may include a cloud server or a group of cloud servers. In some implementations, the platform 220 may be designed to be modular such that software components may be swapped in or out. As such, the platform 220 may be easily and/or quickly reconfigured for different uses.

In some implementations, as shown, the platform 220 may be hosted in a cloud computing environment 222. Notably, while implementations described herein describe the platform 220 as being hosted in the cloud computing environment 222, in some implementations, the platform 220 may not be cloud-based (i.e., may be implemented outside of a cloud computing environment) or may be partially cloud-based.

The cloud computing environment 222 includes an environment that hosts the platform 220. The cloud computing environment 222 may provide computation, software, data access, storage, etc. services that do not require end-user (e.g., the user device 210) knowledge of a physical location and configuration of system(s) and/or device(s) that hosts the platform 220. As shown, the cloud computing environment 222 may include a group of computing resources 224 (referred to collectively as "computing resources 224" and individually as "computing resource 224").

The computing resource 224 includes one or more personal computers, workstation computers, server devices, or other types of computation and/or communication devices. In some implementations, the computing resource 224 may host the platform 220. The cloud resources may include compute instances executing in the computing resource 224, storage devices provided in the computing resource 224, data transfer devices provided by the computing resource 224, etc. In some implementations, the computing resource 224 may communicate with other computing resources 224 via wired connections, wireless connections, or a combination of wired and wireless connections.

As further shown in FIG. 2, the computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

The application 224-1 includes one or more software applications that may be provided to or accessed by the user device 210 and/or the platform 220. The application 224-1 may eliminate a need to install and execute the software applications on the user device 210. For example, the application 224-1 may include software associated with the platform 220 and/or any other software capable of being provided via the cloud computing environment 222. In some implementations, one application 224-1 may send/receive information to/from one or more other applications 224-1, via the virtual machine 224-2.

The virtual machine 224-2 includes a software implementation of a machine (e.g., a computer) that executes programs like a physical machine. The virtual machine 224-2 may be either a system virtual machine or a process virtual machine, depending upon use and degree of correspondence to any real machine by the virtual machine 224-2. A system virtual machine may provide a complete system platform that supports execution of a complete operating system ("OS"). A process virtual machine may execute a single program, and may support a single process. In some implementations, the virtual machine 224-2 may execute on behalf of a user (e.g., the user device 210), and may manage infrastructure of the cloud computing environment 222, such as data management, synchronization, or long-duration data transfers.

The virtualized storage 224-3 includes one or more storage systems and/or one or more devices that use virtualization techniques within the storage systems or devices of the computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 224-4 may provide hardware virtualization techniques that allow multiple operating systems (e.g., "guest operating systems") to execute concurrently on a host computer, such as the computing resource 224. The hypervisor 224-4 may present a virtual operating platform to the guest operating systems, and may manage the execution of the guest operating systems. Multiple instances of a variety of operating systems may share virtualized hardware resources.

The network 230 includes one or more wired and/or wireless networks. For example, the network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
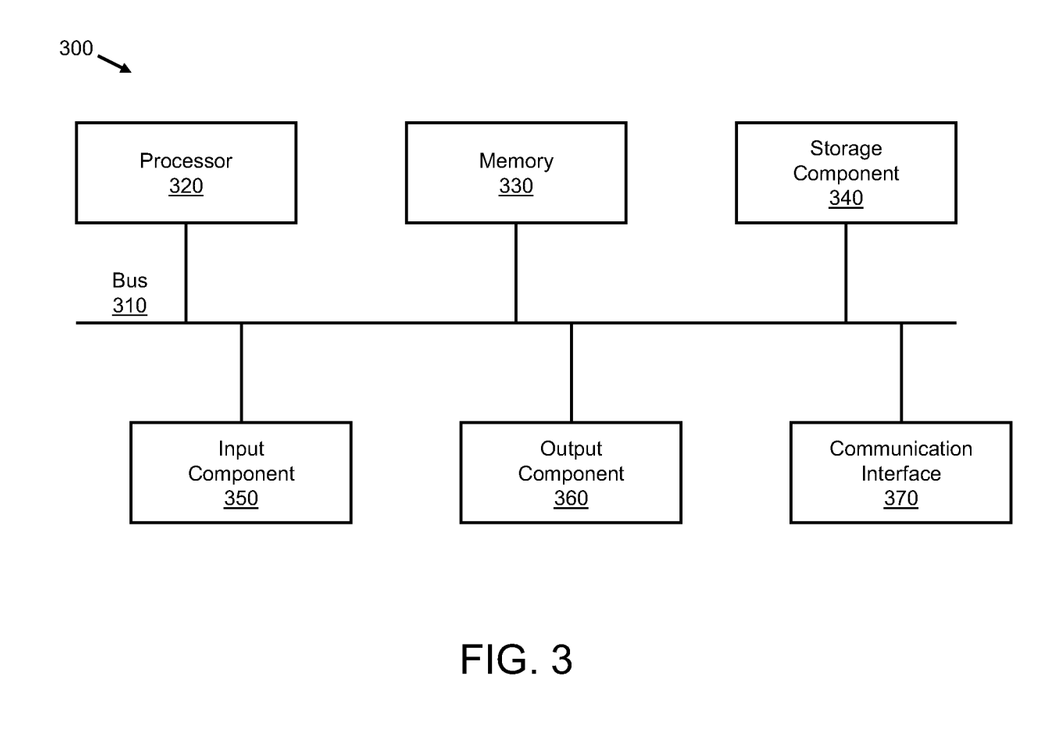
FIG. 3 is a block diagram of example components of one or more devices of FIG. 2.

FIG. 3 is a block diagram of example components of one or more devices of FIG. 2.

A device 300 may correspond to the user device 210 and/or the platform 220. As shown in FIG. 3, the device 300 may include a bus 310, a processor 320, a memory 330, a storage component 340, an input component 350, an output component 360, and a communication interface 370.

The bus 310 includes a component that permits communication among the components of the device 300. The processor 320 is implemented in hardware, software, or a combination of hardware and software. The processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 320 includes one or more processors capable of being programmed to perform a function. The memory 330 includes a random access memory (RAM), a read only memory (ROM), and/or another type of dynamic or static storage device (e.g., a flash memory, a magnetic memory, and/or an optical memory) that stores information and/or instructions for use by the processor 320.

The storage component 340 stores information and/or software related to the operation and use of the device 300. For example, the storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 350 includes a component that permits the device 300 to receive information, such as via user input (e.g., a touch screen display, a keyboard, a keypad, a mouse, a button, a switch, and/or a microphone). Additionally, or alternatively, the input component 350 may include a sensor for sensing information (e.g., a global positioning system (GPS) component, an accelerometer, a gyroscope, and/or an actuator). The output component 360 includes a component that provides output information from the device 300 (e.g., a display, a speaker, and/or one or more light-emitting diodes (LEDs)).

The communication interface 370 includes a transceiver-like component (e.g., a transceiver and/or a separate receiver and transmitter) that enables the device 300 to communicate with other devices, such as via a wired connection, a wireless connection, or a combination of wired and wireless connections. The communication interface 370 may permit the device 300 to receive information from another device and/or provide information to another device. For example, the communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

The device 300 may perform one or more processes described herein. The device 300 may perform these processes in response to the processor 320 executing software instructions stored by a non-transitory computer-readable medium, such as the memory 330 and/or the storage component 340. A computer-readable medium is defined herein as a non-transitory memory device. A memory device includes memory space within a single physical storage device or memory space spread across multiple physical storage devices.

Software instructions may be read into the memory 330 and/or the storage component 340 from another computer-readable medium or from another device via the communication interface 370. When executed, software instructions stored in the memory 330 and/or the storage component 340 may cause the processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, the device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

In embodiments, any one of the operations or processes of FIGS. 4-9 may be implemented by or using any one of the elements illustrated in FIGS. 2 and 3.

According to some embodiments, a general process for neural network based image compression may be as follows. Given an image or video sequence x, the target of NIC is to use the image x as the input to an DNN encoder to compute a compressed representation $\hat{x}$ that is compact for storage and transmission purposes. Subsequently, the compressed representation $\hat{x}$ is used as the input to a DNN decoder to reconstruct an image $\bar{x}$. Some NIC methods may take a variational autoencoder (VAE) structure, where the DNN encoders directly use the entire image x as its input, which is passed through a set of network layers that work like a black box to compute the output representation (i.e. the compressed representation $\hat{x}$). Correspondingly, the DNN decoder takes the entire compressed representation $\hat{x}$ as its input, which is passed through another set of network layers that work like another black box to compute the reconstructed image $\bar{x}$. A Rate-Distortion (R-D) loss is optimized to achieve trade-off between the distortion loss D (x, $\bar{x}$) of the reconstructed image $\bar{x}$ and the bit consumption R of the compressed representation $\hat{x}$ with a trade-off hyperparameter $\lambda$ using the following target loss function L:

$$L(x,\bar{x},\hat{x})=\lambda D(x,\bar{x})+R(\hat{x}) \quad \text{Equation (1)}$$

Embodiments relate to a content-adaptive E2E online training NIC framework for multiple blocks. In content-adaptive online training, in order to train multiple blocks, first the input image x is split into multiple blocks. For example, an image with size 2048×2048 may be split into 16 blocks with size 512×512. A more detailed description is provided with reference to FIG. 4 and FIG. 5. Splitting the input image saves computing memory and allows for parallel computing. Each block is then compressed individually by a rate-distortion compression method (such as the general NIC process described). In particular, the split input image is input to an encoder (e.g., the DNN encoder) to compute a compressed representation $\hat{x}$ of the input image x. The compressed representation $\hat{x}$ is then input to a decoder (e.g., the DNN decoder) to generate an output (i.e., a reconstructed image $\bar{x}$). A neural network based pretrained (or non-pretrained) network is used to as a post-enhancement network. The online training of this post-enhancement network is based on the multiple blocks. During the online training, the partial (or entire) parameters of the post-enhancement network may be updated. The updated partial (or entire) parameters are encoded into bitstreams, along with the encoded multiple blocks. By using these updated parameters (fine-tuned by one or multiple images), the DNN decoder may decode the encoded block and achieve better compression performance. This fine-tuning process is used as a preprocessing step in the content-adaptive online training NIC framework for boosting the compression performance of any pretrained E2E NIC compression method. In some embodiments, the method may also be used on E2E NIC frameworks trained by the content-adaptive online training NIC framework itself.

A detailed description of the preprocessing of the content-adaptive online training NIC framework, according to one or more embodiments, will now be described.

As mentioned, the pretrained post-enhancement network receives multiple blocks as input. Then, the post-enhancement network is fine-tuned based on the input multiple blocks. The fine-tuned post-enhancement network is used to obtain updated parameters by which the NIC framework is updated. In this manner, the post-enhancement network may be adapted to the target image content. When fine-tuning the post-enhancement network, one or more of the network parameters may be updated.

In some embodiments, the parameters may be entirely or partially updated. For example, the parameters are updated only on partial parts of the post-enhancement network (such as last layer of the convolutional neural network). As another example, the parameters may be updated on multiple or all modules of the post-enhancement network.

In some embodiments, only the bias terms are optimized and updated. In another example embodiment, the coefficient (weight) terms are optimized. Alternatively, e.g., all the parameters may be optimized.

In some embodiments, the post-enhancement network is fine-tuned and generates the updated NIC framework based on multiple blocks that form a large block/image. In some embodiments, the post-enhancement network is fine-tuned and the fine-tuned post-enhancement network generates the updated framework based on a set of blocks that may not be adjacent to each other. For example, the set of blocks may be randomly selected from the input multiple blocks.

The fine-tuning process contains multiple epochs where the parameters are updated in this iterative online training process. Fine-tuning is stopped when the training loss (e.g., determined based on the target loss function in Equation 1) has flattened or is about to flatten. There are two key hyperparameters in the content-adaptive online training NIC framework: step size and number of steps. Step size indicates the 'learning rate' of the online training NIC framework. Images with different types of content may correspond to different step sizes to achieve the best optimization results. Number of steps indicates the number of updates operated. Together with the target loss function (Equation 1), the hyperparameters are used for the online learning process. For example, the step size can be used in a gradient descent algorithm or a backpropagation calculation performed in the learning process. The number of iterations can be used as a threshold of a maximum number of iterations to control when the learning process may be terminated. In some embodiments, during the iterative online training process, the learning rate (i.e., step size) may be altered in each step by a scheduler. The scheduler will decide the learning rate value, which can be increasing, decreasing, or kept the same for several intervals. There may be a single scheduler or multiple (different) schedulers for different input images. Multiple updated parameters may be generated based on multiple learning rate schedulers, and the scheduler with the better compression performance for each of the updated parameters may be chosen. At the end of the fine-tuning process, updated parameters are computed. In some embodiments, the updated parameters are then compressed at the end of the fine-tuning process. For example, a compression algorithm (such as LZMA2) may be used to compress the updated parameters. In another example embodiment, the compression of the updated parameters is not performed.

In some embodiments, the updated parameters are calculated as the difference between fine-tuned parameters and pretrained parameters. In some embodiments, the updated parameters are the fine-tuned parameters. In another example embodiment, the updated parameters are some transforms of the fine-tuned parameters.

Figure 4:
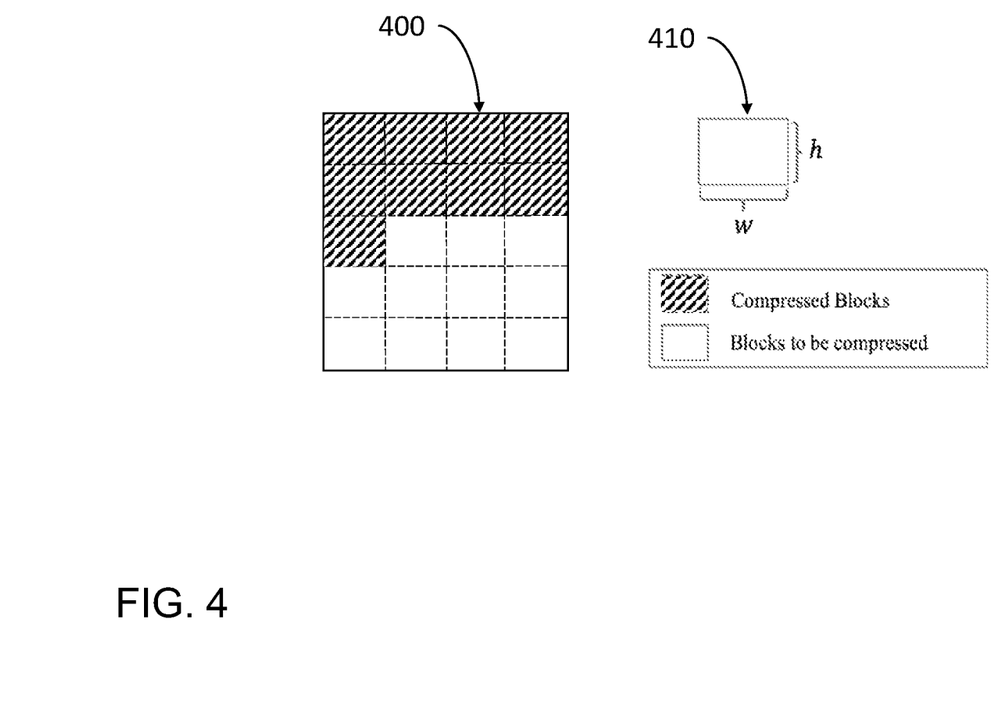
FIG. 4 illustrates an example of block-wise image coding.

FIG. 4 illustrates an example of block-wise image coding. For the content-adaptive online training NIC framework according to embodiments, instead of directly encoding an entire input image, a block-based coding mechanism is used to compress the image frames. Using the block-based coding mechanism, the entire input image is first partitioned into blocks of the same (or various) sizes, and the blocks are compressed individually.

As shown in FIG. 4, an image 400 may first be split into blocks (illustrated by the dashed line in FIG. 4) and the spilt blocks may be compressed instead of the image 400 itself. The compressed blocks are shaded in FIG. 4 and the blocks to be compressed are not shaded. The split blocks may be equally sized or non-equally sized. The step size for each block may be different. To this end, different step sizes may be assigned for an image 400 in order to achieve better compression results. Block 410 is an example of one of the split blocks with a height h and width w. The blocks are passed through a block-wise image encoding process to generate a bitstream of encoded information.

Figure 5:
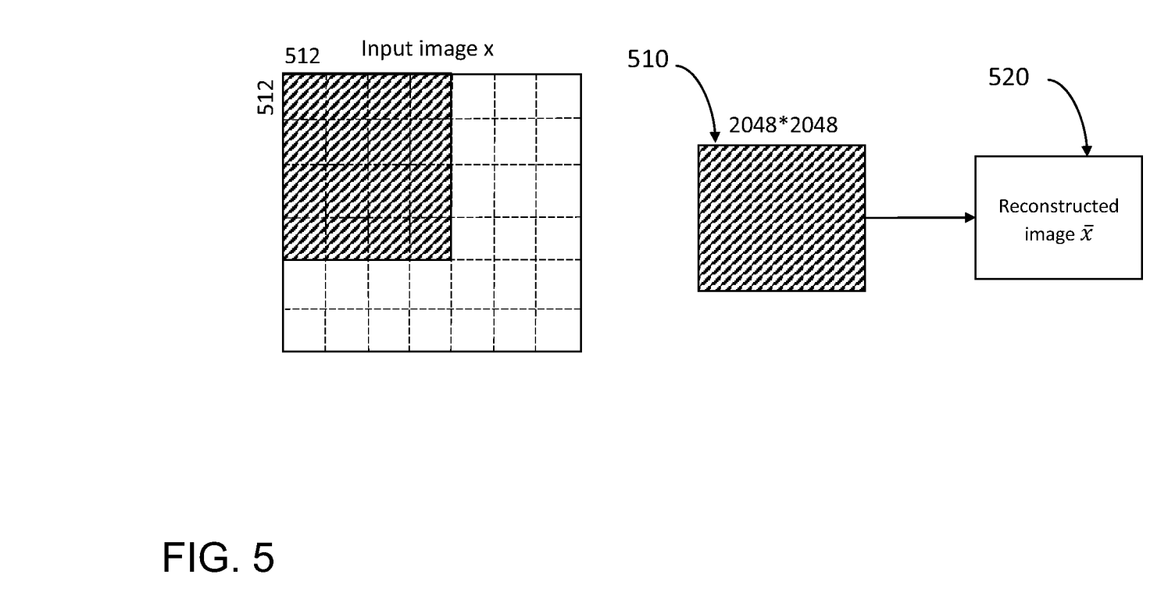
FIG. 5 is an example illustrating content adaptive online training for multiple blocks.

FIG. 5 is an example illustrating content adaptive online training for the multiple blocks. As shown in FIG. 5, the input image x may be split into 49 blocks of size 512×512. In some embodiments, the content-adaptive online training is applied to all the blocks. In the example of FIG. 5, the content-adaptive online training is applied to 16 blocks where the encoded content adaptive area 510 is 2048×2048. The size of the blocks and the content adaptive area may vary and are not limited by the example illustration of FIG. 5. The content adaptive area 510 is then processed by the content-adaptive online training NIC framework to generate a reconstructed image $\bar{x}$ 520.

The step size (i.e., the learning rate of the content-adaptive online training NIC framework) may be chosen based on the characteristics of the image (or a block). For example, a characteristic of an image may be based on an red-green-blue (RGB) color model and the RGB variance of the image. Further, in some embodiments, the step size may be chosen based on an RD performance of the image (or the block). Therefore, according to embodiments thereof, multiple updated parameters may be generated based on different step sizes, and the step size with the better compression performance for each of the updated parameters may be chosen.

Multiple learning rate schedulers may be assigned for different blocks in order to achieve better compression results. In some embodiments, all blocks share the same learning rate schedules. Learning rate scheduler selection may also be based on the characteristics of a block, such as the RGB variance of the block or the RD performance of the block.

Different blocks may update different parameters in different modules (for example, in context module or hyper decoder) or different types of parameters (bias or weights) of the content-adaptive online training NIC framework according to embodiments. In some embodiments, all the blocks share the same updated parameters. The parameters (to be updated) may be chosen based on the characteristics of a block, such as the RGB variance of the block or the RD performance of the block.

Different blocks may choose different ways to transform the updated parameters. For example, in some embodiments, one block may choose to update parameters based on the difference between fine-tuned parameters and pretrained parameters. Another block may choose to update the parameters directly. In some embodiments, all the blocks updated parameters in the same way. The ways to transform the updated parameters may be chosen based on the characteristics of a block, such as the RGB variance of the block or the RD performance of the block.

Different blocks may choose different ways to compress the updated parameters. For example, one block may use the LZMA2 algorithm to compress the updated parameters. Another block may use the bzip2 algorithm to compress the updated parameters. Embodiments are not limited to this and may use any compression algorithm suitable for compressing the parameters. In some embodiments, all blocks use the same method to compress (or not compress) the updated parameters. The compression method may be chosen based on the characteristics of a block, such as the RGB variance of the block or the RD performance of the block.

Figure 6:
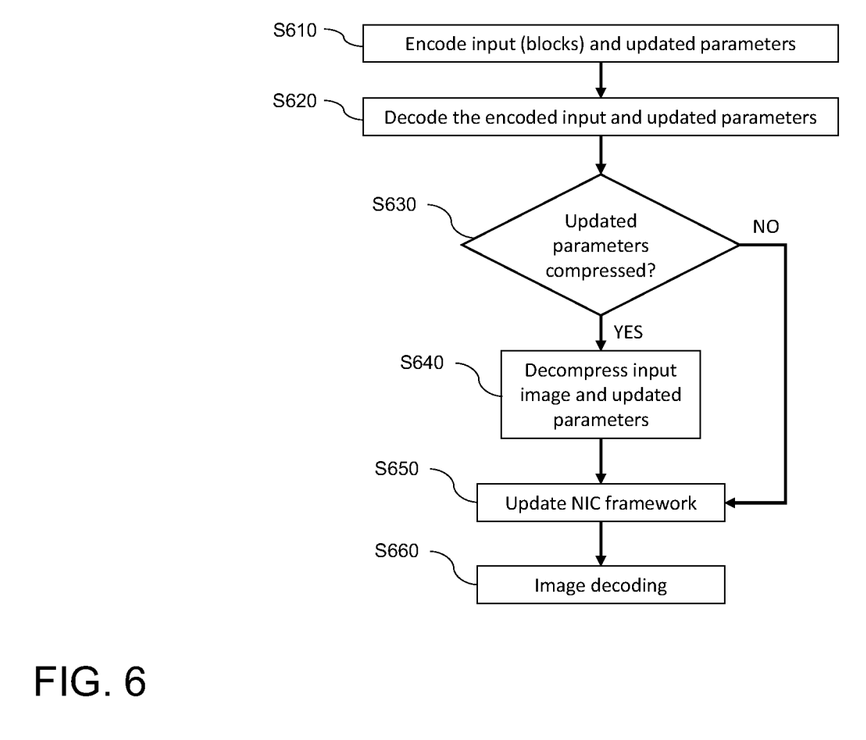
FIG. 6 is a flowchart example of the coding process according to embodiments.

A coding process of the content-adaptive online training NIC framework applied to the blocks to generate a reconstructed image is described with reference to FIG. 6. FIG. 6 is a flowchart example of the coding process according to embodiments.

First, at S610, the NIC framework encodes the input image and the updated parameters. Subsequently, the encoded input and the updated parameters are decoded (S620). If the updated parameters were compressed (YES at S630), the updated parameters obtained from the online training process are first decompressed (S640). If the updated parameters were not compressed (NO at S630), the process proceeds to S650. At S650, the NIC framework is updated at the decoder side using the decoded updated parameters from S620 or the decompressed decoded updated parameters from S640. Finally, at S660, the updated NIC framework decoder is used to for image decoding (to generate the reconstructed image $\tilde{x}$). Based on how the parameters transformed, the updated parameter values update the original (pretrained) bias terms.

Embodiments do not put any restrictions on the methods used for, e.g., a neural encoder, an encoder, a decoder, and a neural decoder. The content-adaptive online training methods, according to embodiments, may accommodate different types of NIC frameworks. For example, the process may be performed using different types of encoding and decoding DNN.

Figure 7:
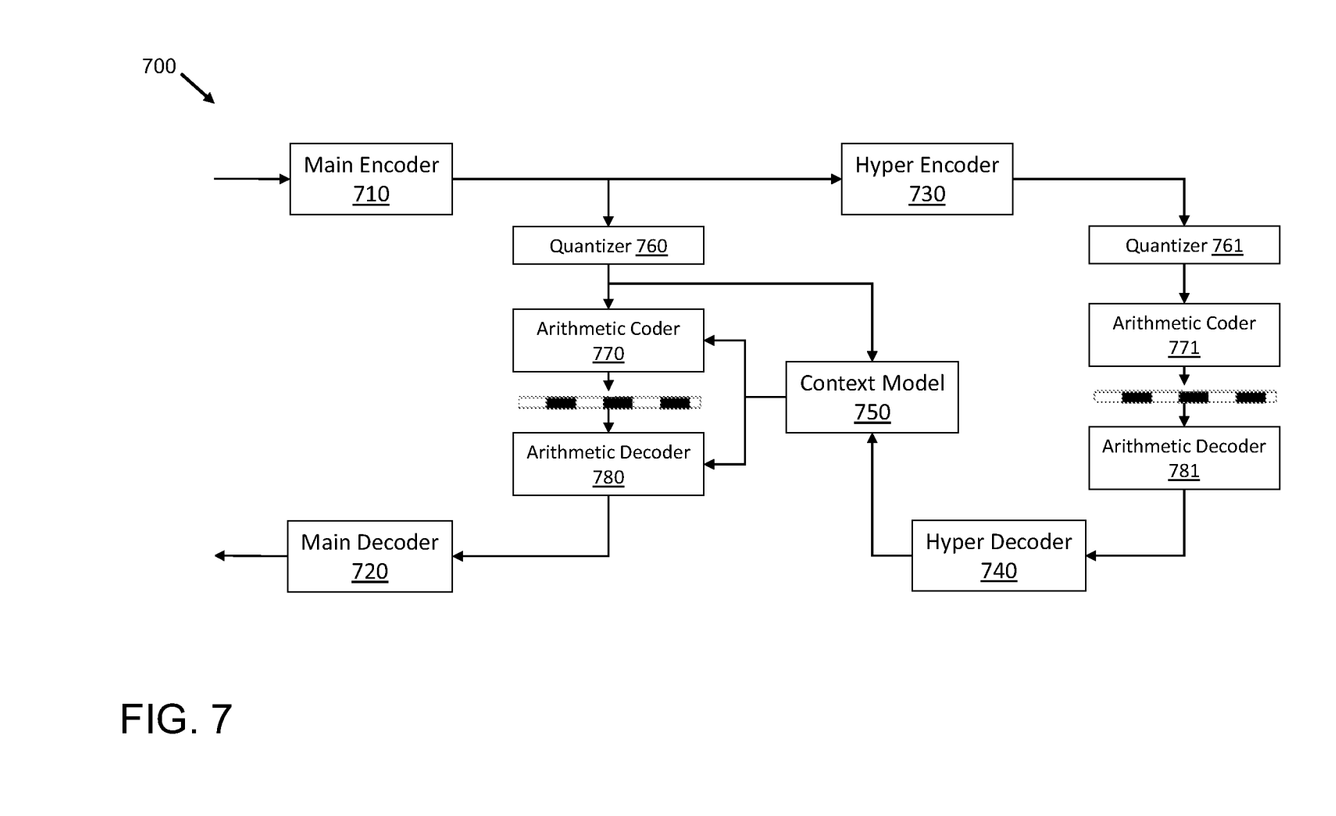
FIG. 7 is an illustration of an exemplary block diagram of an end-to-end (E2E) neural image compression (NIC) framework using content-adaptive online training, according to embodiments

FIG. 7 is an illustration of an exemplary block diagram 700 of the E2E NIC framework using content-adaptive online training, according to embodiments.

As shown in FIG. 7, the E2E NIC framework includes a main encoder 710, main decoder 720, hyper encoder 730, hyper decoder 740, and a context model 750. The E2E NIC framework may include one or multiple such modules. The E2E NIC framework further includes a quantizer 760/761, an arithmetic coder 770/771, and an arithmetic decoder 780/781. The same or similar modules are represented by the same reference numbers. The E2E NIC framework may include one or more modules not shown in FIG. 7.

The E2E NIC framework may use any DNN-based image compression method, such as scale-hyperprior encoder-decoder framework (or Gaussian Mixture Likelihoods framework) and its variants, RNN-based recursive compression method and its variants.

According to embodiments of the present disclosure, an E2E NIC framework may utilize the block diagram 700 as follows. Given an input image or video sequence x, the main encoder 710 may compute a compressed representation $\hat{x}$ that is compact for storage and transmission purposes when compared to the input image x. The compressed representation $\hat{x}$ may be quantized into a discrete-valued quantized representation $\check{x}$ using quantizer 760. This discrete-valued quantized representation $\check{x}$ may then be entropy encoded into a bitstream using the arithmetic coder 770 using arithmetic coding (lossless or lossy). On the decoder side, the bitstream may go through lossless or lossy entropy decoding using arithmetic decoder 780 to recover discrete-valued quantized representation $\check{x}$. This discrete-valued quantized representation $\check{x}$ may then be input into the main decoder 720 to recover and/or reconstruct the input image or video sequence x. The main encoder 710 and main decoder 720 may be a neural network based encoders and decoders (e.g., DNN based coder).

According to some embodiments, the E2E NIC framework may, during the online training phase, includes hyper prior and context models to further improve the compression performance. A hyper prior model may be used to capture spatial dependencies in latent representations generated between layers in the neural network. According to some embodiments, side information may be used by a hyper prior model, side information being commonly generated by motion-compensated temporal interpolation of the neighboring reference frames at the decoder side. This side information may be used for training and inferring the E2E NIC framework. The hyper encoder 730 may encode the compressed representation $\hat{x}$ using a hyperprior neural network based encoder. Then, a hyper compressed representation of the hyper-encoded compressed representation may be generated using the quantizer 761 and the arithmetic coder 771. The arithmetic decoder 781 may decode the hyper compressed representation. Then a hyper reconstructed image x' may be generated using a hyper prior neural network based hyper decoder 740. The neural network based context model 750 may be trained using the hyper reconstructed image and the quantized representation from quantizer 760. The arithmetic coder 770 and arithmetic decoder 780 may use the context model 750 for encoding and decoding, respectively.

According to embodiments, the E2E NIC framework is self-trained. The target of the training process is to learn DNN encoding and DNN decoding (i.e., main encoder 710 and main decoder 720). In the training process, the weight coefficients of the DNNs (i.e., main encoder 710 and main decoder 720) are first initialized by, for example, using pretrained corresponding DNN models, or by setting them to random numbers. Then, given an input training image x, input training image x is passed through the encoding process described in FIG. 4 to generate the encoded information into a bitstream, which will then be passed through the decoding process described in FIG. 5 to compute and reconstruct the image $\tilde{x}$. For the E2E NIC framework (as shown in FIG. 7), two competing targets are dealt with: better reconstruction quality versus less bit consumption. A quality loss function $D(x, \tilde{x})$ is used to measure the reconstruction quality (also called the distortion loss), such as the traditional peak signal-to-noise ratio (PSNR), multi-scale structural similarity index measure (MS-SSIM), or a weighted combination of both. A rate loss $R(\Sigma_1'' s_i, \Sigma_1'' u_i)$ is computed to measure the bit consumption of the compressed representations. Therefore, a trade-off hyperparameter X is used to optimize a joint Rate-Distortion (R-D) loss according to the following equation:

$$L(x,\bar{x},\hat{r}_1, \ldots ,\hat{r}_N,\hat{y})=\lambda D(x,\bar{x})+R(\Sigma_1{}^n s_i,\Sigma_1{}^n u_i)+\beta E \quad \text{Equation (2)}$$

Where E measures the distortion of the decoded block residuals compared with the original block residuals before encoding, which acts as regularization loss for the Residual Encoding/Decoding DNNs and the Encoding/Decoding DNNs. β is a hyperparameter to balance the importance of the regularization loss.

In some embodiments, the encoding DNN and the decoding DNN may be updated together based on back-propagated gradients in an E2E framework.

Figure 8:
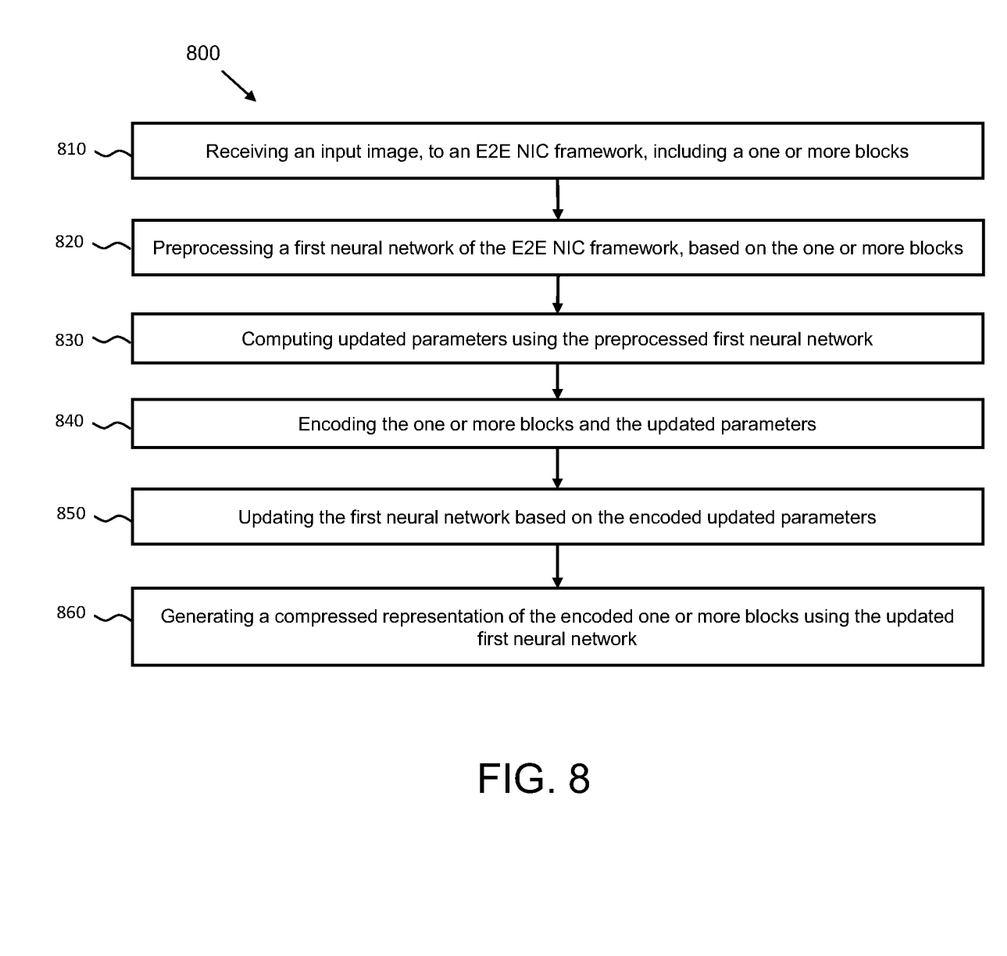
FIG. 8 is a flowchart illustrating a method content-adaptive online training for end-to-end (E2E) neural image compression (NIC) using a neural network, according to embodiments.

FIG. 8 is a flowchart illustrating a method 800 for content-adaptive online training of E2E NIC using a neural network, according to embodiments.

In some implementations, one or more process blocks of FIG. 8 may be performed by the platform 220. In some implementations, one or more process blocks of FIG. 8 may be performed by another device or a group of devices separate from or including the platform 220, such as the user device 210.

As shown in FIG. 8, at operation 810 the method may include receiving an input image, to an E2E NIC framework, include one or more blocks. In some embodiments, the method includes splitting the input image into the one or more blocks and compressing the one or more blocks individually before one of operations 820-840. The method may also compress the updated parameters before encoding at operation 840.

At operation 820, the method 800 may include preprocessing a neural network of the E2E NIC framework, based on the one or more blocks. When preprocessing the neural network, the neural network is fine-tuned using the one or more blocks.

At operation 830, the method 800 may include computing updated parameters using the preprocessed neural network. The updated parameters may include a learning rate and a number of steps, and wherein the learning rate and the number of steps are selected based on characteristics of the input image. The characteristics of the input image may be one of a RGB variance of the input image and an RD performance of the input image.

At operation 840, the method 800 may include encoding the one or more blocks and the updated parameters.

At operation 850, the method 800 may include updating the neural network based on the encoded updated parameters.

At operation 860, the method 800 may include generating a compressed representation of the encoded one or more blocks using the updated neural network. In some embodiments, the method further includes decoding the compressed representation using arithmetic decoding. Further, generating a reconstructed image based on the decoded compressed representation using a neural network based decoder.

Although FIG. 8 shows example blocks of the method, in some implementations, the method may include additional blocks, fewer blocks, different blocks, or differently arranged blocks than those depicted in FIG. 8. Additionally, or alternatively, two or more of the blocks of the method may be performed in parallel.

Figure 9:
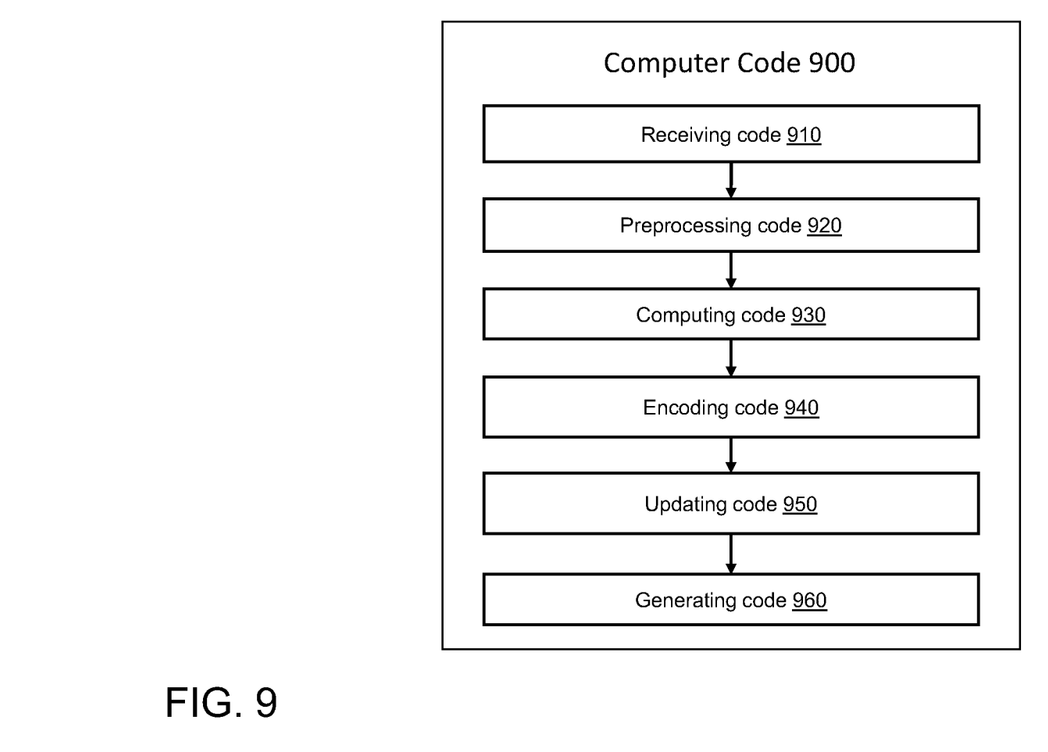
FIG. 9 is a block diagram of an example of computer code for content-adaptive online training for end-to-end (E2E) neural image compression (NIC) using a neural network, according to embodiments.

FIG. 9 is a block diagram of an example of computer code 900 for content-adaptive online training of E2E NIC using a neural network, according to embodiments. According to embodiments of the present disclosure, an apparatus/device including at least one processor with memory storing computer program code may be provided. The computer program code may be configured to, when executed by the at least one processor, perform any number of aspects of the present disclosure.

As shown in FIG. 9, the computer program code 900 includes receiving code 910, preprocessing code 920, computing code 930, encoding code 940, updating code 950, and generating code 960.

The receiving code 910 is configured to cause the at least one processor to receive an input image, to an E2E NIC framework, including a one or more blocks.

The computer program code 900 may further include code configured to cause the at least one processor to split/partition the input image into the one or more blocks and first compressing code configured to cause the at least one processor to compress the one or more blocks individually. The computer program code 900 may even further include code configured to cause the at least one processor to compress the updated parameters.

The preprocessing code 920 is configured to cause the at least one processor to preprocess a neural network of the E2E NIC framework, based on the one or more blocks. When preprocessing the neural network, the neural network is fine-tuned using the one or more blocks.

The computing code 930 is configured to cause at least one processor to compute updated parameters using the preprocessed neural network. The updated parameters may include a learning rate and a number of steps, and wherein the learning rate and the number of steps are selected based on characteristics of the input image. The characteristics of the input image may be one of a RGB variance of the input image and an RD performance of the input image.

The encoding code 940 is configured to cause at least one processor to encode the one or more blocks and the updated parameters.

The updating code 950 is configured to cause at least one processor to update the neural network based on the encoded updated parameters.

The generating code 960 is configured to cause at least one processor to generate a compressed representation of the encoded one or more blocks using the updated neural network. The computer program code 900 may even further include code configured to cause at least one processor to decoding the compressed representation using arithmetic decoding. Further, code configured to cause at least one processor to generate a reconstructed image based on the decoded compressed representation using a neural network based decoder.

Although FIG. 9 shows example blocks of code, in some implementations, the apparatus/device may include additional blocks, fewer blocks, different blocks, or differently arranged blocks than those depicted in FIG. 9. Additionally, or alternatively, two or more of the blocks of the apparatus may be combined. In other words, while FIG. 9 shows distinct blocks of code, the various code instructions need not be distinct and could be intermingled.

The methods and processes for content-adaptive online training of E2E NIC frameworks described in the present disclosure provide the flexibility to adaptive online training mechanisms to improve the NIC coding efficiency and support different types of learning-based quantization methods, including DNN-based or conventional model-based methods. The described methods also provides a flexible and general framework that accommodates different DNN architectures and a plurality of quality metrics.

The techniques described above, can be implemented as computer software using computer-readable instructions and physically stored in one or more computer-readable media or by a specifically configured one or more hardware processors. For example, FIG. 2 shows an environment 200 suitable for implementing various embodiments. In one example, the one or more processors execute a program that is stored in a non-transitory computer-readable medium.

As used herein, the term component is intended to be broadly construed as hardware, software, or a combination of hardware and software.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claims is:

1. A method of content-adaptive online training for end-to-end (E2E) neural image compression (NIC) using a neural network performed by at least one processor, the method comprising:
   receiving, by an E2E NIC framework, an input image including one or more blocks;
   preprocessing a first neural network of the E2E NIC framework, based on the one or more blocks;
   computing updated parameters using the preprocessed first neural network, wherein the updated parameters include a learning rate and a number of steps, and wherein the learning rate and the number of steps are selected based on characteristics of the input image;
   encoding the one or more blocks and the updated parameters;
   updating the first neural network based on the encoded updated parameters; and
   generating a compressed representation of the encoded one or more blocks using the updated first neural network.

2. The method according to claim 1, further comprising: splitting the input image into the one or more blocks; and compressing the one or more blocks individually.

3. The method according to claim 1, further comprising; decoding the compressed representation using arithmetic decoding; and
   generating a reconstructed image based on the decoded compressed representation using a second neural network.

4. The method according to claim 1, further comprising compressing the updated parameters.

5. The method according to claim 1, wherein the characteristics of the input image are one of a RGB variance of the input image and an RD performance of the input image.

6. The method according to claim 1, wherein when preprocessing the first neural network, the first neural network is fine-tuned using the one or more blocks.

7. An apparatus for content-adaptive online training for end-to-end (E2E) neural image compression (NIC) using a neural network, the apparatus comprising:
   at least one memory configured to store computer program code; and
   at least one processor configured to read the computer program code and operate as instructed by the computer program code, the computer program code including:
   receiving code configured to cause the at least one processor to receive, by an E2E NIC framework, an input including one or more blocks;
   preprocessing code configured to cause the at least one processor to preprocess a first neural network of the E2E NIC framework, based on the one or more blocks;
   computing code configured to cause the at least one processor to compute updated parameters using the preprocessed first neural network, wherein the updated parameters include a learning rate and a number of steps, and wherein the learning rate and the number of steps are selected based on characteristics of the input image;
   encoding code configured to cause the at least one processor to encode the one or more blocks and the updated parameters;
   updating code configured to cause the at least one processor to update the first neural network based on the encoded updated parameters; and
   first generating code configured to cause the at least one processor to generate a compressed representation of the encoded one or more blocks using the updated first neural network.

8. The apparatus of claim 7, the computer program code further including:
   splitting code configured to cause the at least one processor to split the input image into the one or more blocks; and
   compressing code configured to cause the at least one processor to compress the one or more blocks individually.

9. The apparatus of claim 7, the computer program code further including:
   decoding code configured to cause the at least one processor to decode the compressed representation using arithmetic decoding; and
   second generating code configured to cause the at least one processor to generate a reconstructed image based on the decoded compressed representation using a second neural network.

10. The apparatus of claim 7, the computer program code further including compressing code configured to cause the at least one processor to compress the updated parameters.

11. The apparatus of claim 7, wherein the characteristics of the input image are one of a RGB variance of the input image and an RD performance of the input image.

12. The apparatus of claim 7, wherein when preprocessing the first neural network, the first neural network is fine-tuned using the one or more blocks.

13. A non-transitory computer-readable medium storing instructions that, when executed by at least one processor of an apparatus for content-adaptive online training for end-to-end (E2E) neural image compression (NIC) using a neural network, cause the at least one processor to:
- receive, by an E2E NIC framework, an input image including one or more blocks;
- preprocess a first neural network of the E2E NIC framework, based on the one or more blocks;
- compute updated parameters using the preprocessed first neural network;
- encode the one or more blocks and the updated parameters, wherein the updated parameters include a learning rate and a number of steps, and wherein the learning rate and the number of steps are selected based on characteristics of the input image;
- update the first neural network based on the encoded updated parameters; and
- generate a compressed representation of the encoded one or more blocks using the updated first neural network.

14. The non-transitory computer-readable medium of claim 13, wherein the instructions further cause the at least one processor to:
- split the input image into the one or more blocks; and
- compress the one or more blocks individually.

15. The non-transitory computer-readable medium of claim 13, wherein the instructions further cause the at least one processor to:
- decode the compressed representation using arithmetic decoding; and
- generate a reconstructed image based on the decoded compressed representation using a second neural network.

16. The non-transitory computer-readable medium of claim 13, wherein the instructions further cause the at least one processor to compress the updated parameters.

17. The non-transitory computer-readable medium of claim 13, wherein the characteristics of the input image are one of a RGB variance of the input image and an RD performance of the input image.

18. The non-transitory computer-readable medium of claim 13, wherein when preprocessing the first neural network, the first neural network is fine-tuned using the one or more blocks.

* * * * *